Oct. 29, 1935.　　　　J. R. ELSOM　　　　2,019,178
GRADE INDICATOR
Filed Jan. 19, 1934
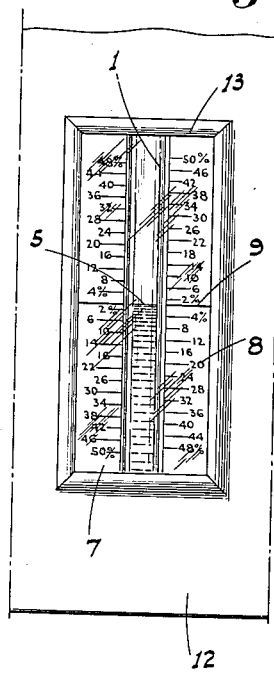
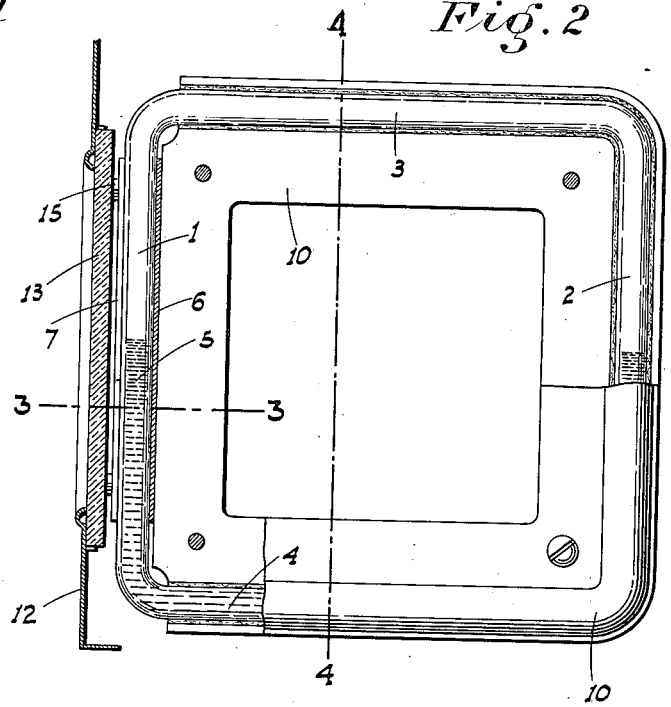
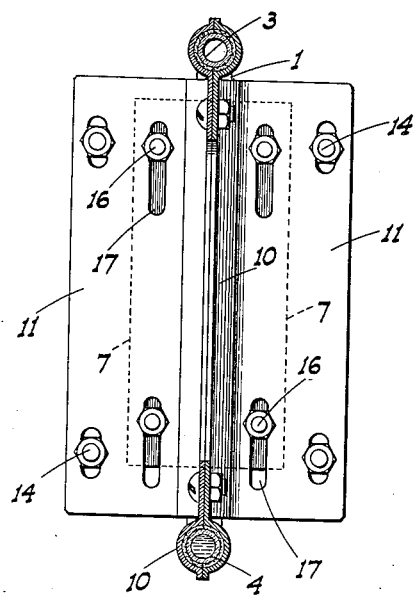
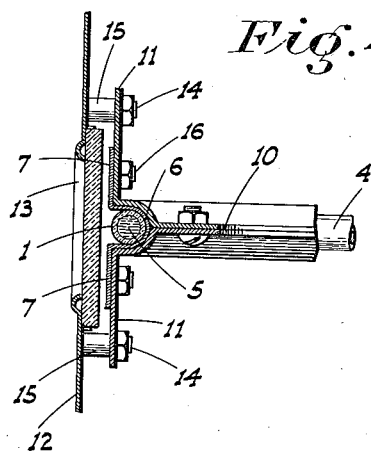
INVENTOR
*J. R. Elsom*
BY
ATTORNEY Patented Oct. 29, 1935

2,019,178

UNITED STATES PATENT OFFICE 2,019,178

GRADE INDICATOR

John R. Elsom, Fresno, Calif.

Application January 19, 1934, Serial No. 707,244

3 Claims. (Cl. 33—209)

This invention relates to grade indicating devices, my principal object being to provide a liquid-level grade indicator especially designed for use on a motor vehicle, adapted to be mounted on and behind the instrument board of the vehicle with a portion exposed through the board; and so constructed and arranged that accurate readings of both up and down grades traversed by the vehicle will be instantly indicated in plain view of the driver of the vehicle.

A further object is to construct the device so that without making any changes in the construction or graduations of the grade indicating scale, and without changing the amount of liquid in the device it may be easily and quickly adjusted to conform to any instrument board, whether such board be vertical or with a forward slope as is frequently the case.

The readings on the indicator are designed to be in terms of per cent of grade and not in degrees of grade.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a front view of the grade indicator as viewed from the instrument board.

Figure 2 is a side view of the device partly in section.

Figure 3 is a transverse section looking back taken on the line 3—3 of Figure 2.

Figure 4 is a cross section on the line 4—4 of Figure 1.

Referring now more particularly to the characters of reference on the drawing, the grade indicator comprises an endless glass tube disposed in a vertical plane lengthwise of the vehicle, so that it has front and rear vertical legs 1 and 2 respectively connected by top and bottom horizontal legs 3 and 4 respectively. The tube is filled approximately half full with a suitable colored liquid 5, so that the liquid fills the lower leg 4 and extends part way up the vertical legs 1 and 2. Any change of level of the lower leg therefore will cause the liquid to travel up or down the front leg, to the extent determined by the amount of tilt. The liquid of course is of that character which will not congeal nor measurably change its volume under any climatic condition, thus insuring accuracy of grade indication at all times.

The change of level of liquid in the front leg from a normal position as occasioned by such tilting is indicated on a suitably graduated scale. This scale preferably consists of a plate somewhat shorter than said front leg and formed with a curved portion 6 extending about and slidably embracing the back of said leg, with side wings 7 projecting laterally in opposite directions from the plane of the front side of the leg. The front faces of the wings are provided with vertical rows of graduations 8 reading up and down from a horizontal or zero mark 9 disposed approximately midway of the height of the wings. The spacings of the graduations are of course proportioned according to variations in the level of the liquid in the leg 1 with the tilting of the tube and as determined by the distance between the vertical legs. In order to provide a large number of readings without cramping the same, the graduations on one wing indicate grades between those on the opposite wing as clearly indicated in Figure 1.

The tube is enclosed and protected and also held in a vertical position by a suitable housing 10. This housing is preferably made of a pair of vertically split sections bolted together and having laterally extending flanges 11 on which the wings 7 rest but extending beyond the latter.

As indicated the markings on the indicator plate or graduated scale are in per cents of grade traversed by the vehicle. The proper positioning of the markings are arrived at of course by known mathematical calculations based on the proportionate length of the lower leg 4 of the tube relative to the standard unit of grade percentage calculations (1 ft. rise in 100 of length=1% grade) so that the movement of the liquid column in the tube along the grade per cent markings will be in direct correspondence to the per cents of grade inclinations traversed by the vehicle.

The device is disposed behind the instrument board 12 of the vehicle which is provided with a glass covered window 13 of sufficient size to expose the major area of the scale wings and the adjacent portion of the front leg of the tube. The housing flanges 11 are secured to the instrument board at the sides of the window glass by suitable bolts 14. These bolts have spacers 15 thereabout to hold the flanges spaced from the window, so that the scale may be illuminated at night by the indirect lighting system now generally used on instrument boards of motor vehicles.

The scale wings are adjustably secured to the flanges 11 by bolts 16 passing through vertical slots 17 in said flanges. The purpose of this is to enable the position of the scale up and down the leg to be initially altered when the instrument is being installed as the slope of the instrument board may require to aline the top of the liquid with the zero mark on the scale when the vehicle is on the level. This is obviously necessary since it is desirable for the purpose of visibility that the front leg of the device shall be parallel to the window. If however the instrument board has a slope such that the lower leg of the tube also has a slope even though the car is on the level, the level of the liquid in the front leg will be different from what it would be if said lower leg is horizontal. Adjustment of the scale as above described enables any variation in the mounting of the tube to be properly taken care of without altering the graduating of the scale, the amount of liquid in the tube, or any constructional feature in the device itself.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A grade indicator for use on a motor vehicle having an opaque instrument panel provided with a rectangular opening; said indicator comprising a spirit level tube which includes a substantially vertical transparent liquid-containing indicator leg, a frame in which said tube is mounted and including plate elements extending along said leg and projecting laterally from the same on opposite sides thereof, said leg being substantially countersunk relative to the plate elements, a graduated scale mounted on said elements to read against the liquid in said tube leg, and means to rigidly secure the plate elements on the instrument panel so that the leg and scale are exposed in the opening therein and in symmetrical relation thereto and comprising bolts, and spacers thereon between the panel and plate elements to space the plate elements therefrom to permit indirect illumination of the scale and leg by a source of light disposed behind the panel.

2. A grade indicator for use on a motor vehicle having an opaque instrument panel provided with a rectangular opening; said indicator comprising a spirit level tube which includes a substantially vertical transparent liquid-containing indicator leg, a frame in which said tube is mounted and including plate elements extending along said leg and projecting laterally from the same on opposite sides thereof, means to immovably secure the elements on the panel and so that the leg is exposed in the panel opening, a graduated scale extending lengthwise of the tube leg on one side thereof and secured on the adjacent plate element for adjustment lengthwise of the leg whereby the scale may be initially set to match the normal level of the liquid in the tube leg irrespective of the angular slope of the panel and the consequent normal slope of the tube leg.

3. A grade indicator for use on a motor vehicle having an opaque instrument panel provided with a rectangular opening; said indicator comprising a spirit level tube which includes a substantially vertical transparent liquid-containing indicator leg, a frame in which said tube is mounted and including a plate element extending along said leg and projecting laterally from the same and the corresponding portion of the frame on one side of the leg, a scale plate contacting with said plate element and extending lengthwise of the tube leg adjacent the same to read against the liquid in said leg, means to adjustably secure the scale plate on said element for movement lengthwise of the tube leg and operable from behind the plate element, and means clear of the scale plate to non-adjustably secure the plate element on the panel so that the scale and tube leg are visible through the panel opening and in non-contacting relation with said panel whereby the scale plate may be adjusted after the indicator is secured in place.

JOHN R. ELSOM.